Sept. 22, 1970  A. GREUTER ET AL  3,530,415

ELECTRODYNAMIC SNAP-ACTING ACTUATOR

Filed Nov. 7, 1967  6 Sheets-Sheet 1

United States Patent Office 3,530,415
Patented Sept. 22, 1970

3,530,415
ELECTRODYNAMIC SNAP-ACTING ACTUATOR
Andre Greuter and Arpad Korum, Zurich, Switzerland, assignors to Gesellschaft zur Forderung der Forschung an der Eidgenossichen Technischen Hoschschule, Zurich, Switzerland
Filed Nov. 7, 1967, Ser. No. 681,192
Claims priority, application Switzerland, Nov. 15, 1966, 16,695/66
Int. Cl. H01h 5/18
U.S. Cl. 335—188                                17 Claims

ABSTRACT OF THE DISCLOSURE

An electrodynamic snap-action actuator includes a flexible strip member positioned between first and second support points which are spaced from each other by a distance smaller than the free length of the strip therebetween such that the strip is caused to snap from one to the other side of a straight line between the two support points. The strip member if not itself electrically conductive carries an electrical conductor extending longitudinally therealong and a magnet which supplies a magnetic field whose lines of force cut the electrical conductor, exerts a motor action on the conductor and effects a snap-action movement of the flexible strip dependent upon the direction in which current is passed through the conductor.

---

This invention relates to an electrodynamic snap-action actuator having at least one stable state, and is particularly concerned with an actuator of this type suitable for use with an indicating or display device.

It is an object of the present invention to provide an electrodynamic snap-action actuator of the above-mentioned type which has a comparatively small movable mass and which in consequence can perform a relatively large number of operational steps per unit time. The actuator of the invention is such that it can be of small dimensions and require comparatively little energy to operate it, particularly for the acceleration of its movable element, in consequence of which the source of electrical energy needed to energise the actuator is only comparatively lightly loaded.

Moreover, an actuator should preferably be constructed so that it is not susceptible to vibrations and mechanical shocks, so that it can be used in a trouble-free manner even in movable instruments and apparatus.

These objects are achieved by the electrodynamic actuator in accordance with the invention which comprises at least one flexible strip member positioned between two points of support whose spacing from each other is smaller than the free length of the flexible strip member therebetween so that the flexible strip member snaps from one to the other side of the straight line between the points of support, the flexible strip member carrying at least one electrical conductor extending longitudinally therealong or itself being formed as an electrical conductor, and magnet means providing a magnetic field whose field lines cut the electrical conductor whereby a flow of electric current in a given sense through the conductor causes a snap-action change in position of the flexible strip member.

Depending upon the construction of the flexible strip member or members and the points of support either only one or both of the snap-action positions of the flexible strip members may be stable.

According to one embodiment of electrodynamic actuator, the flexible strip member is arranged to lie between two prongs of a pivotally mounted fork which, upon actuation of the actuator, is entrained and, for example, can actuate a stepping mechanism for driving a counter or register.

In a further embodiment of the invention, the flexible strip member may be fixedly connected at at least one of its support points to a rotatably mounted shaft which, upon operation of the actuator, undergoes a rotational movement which, for example, may drive a stepping mechanism.

According to yet another embodiment of the invention, the flexible strip member is formed as a movable electrical contact element which co-operates with at least one fixed contact so that the actuator forms an electrical relay. Depending upon whether the flexible strip member of the actuator has one stable state or two stable states, such an arrangement will provide either an unpolarised or a polarised relay suitable for a rapid switching sequence.

A further embodiment of electrodynamic actuator in accordance with the invention is constructed so that the flexible strip member acts as an optical reflecting element which reflects a light beam directed thereon to different positions in accordance with the position of the flexible strip member.

The functions which can be achieved with the above-mentioned embodiments of the invention can also be achieved with known devices, but these known devices generally suffer from one or more of the following disadvantages: they can only be made of small size with considerable difficulty; when made with small dimensions they show a comparatively high energy consumption; and the movable parts have a relatively large moment of inertia. The latter fact is partly responsible for the comparatively high consumption of energy and for a moderately high sensitivity to vibration. The consequence of this is that the number of actuating operations which can be accomplished per unit time is limited to a relatively low value.

In order that the invention may be fully understood, a number of embodiments thereof will now be described in detail by way of example and with reference to the accompanying drawings, in which.

Figure 1:
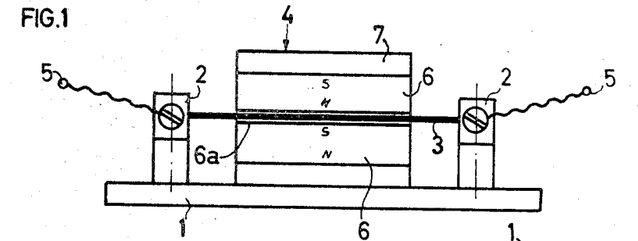
FIG. 1 is a front elevation of a first embodiment of electrodynamic snap-action actuator in accordance with the invention.
Figure 2:
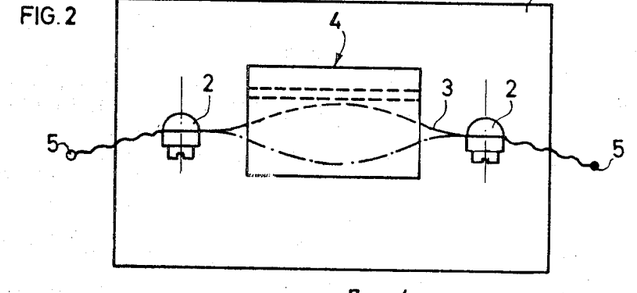
FIG. 2 is a plan view of the actuator shown in FIG. 1.

The electrodynamic snap-action actuator shown in FIGS. 1 and 2 comprises a support member in the form of a base plate 1 on which two clip elements 2 are mounted which provide two points of support for a flexible strip member. The flexible member 3 is a thin, narrow strip of rectangular cross-section, for example having dimensions of 0.008 by 0.125 mm. The flexible strip 3 is formed of an electrically conductive nonferromagnetic material, such as and thus has a basic, inherent characteristic of a leaf spring bronze. The two end portions of the flexible strip 3 are fixedly mounted in the clip elements 2 in such manner that the free length of the flexible strip 3 between the clip elements is somewhat greater than the direct spacing of the clip elements from each other. In consequence of this, the flexible strip due to its inherent leaf spring characteristic must occupy a bowed position either to one or the other side of an imaginary line extending between the two clip elements. Each of these positions constitutes a stable state of the flexible strip 3. The longitudinal axis of the flexible strip always extends approximately parallel to the base plate 1. The clamping surfaces of the two clip elements 2 and consequently the clamped end portions of the flexible strip 3 are arranged in a common plane which extends perpendicular to the base plate 1, as can be seen from FIG. 2. Electrical conductors 5 are connected to the ends of the flexible strip 3, and, since the flexible strip is itself formed of an electrically conductive material, the electrical conductors 5 are effectively connected to each other. If the clip elements 2 are formed of an electrically conductive material, such as a metal, at least one of the clip elements must be insulated from the base plate 1, or alternatively the base plate itself must be formed of an electrically insulating material.

A magnet system 4 is mounted on the base plate 1, and comprises two permanent magnet plates 6 and a U-shaped yoke 7 coupling the two plates 6. The permanent magnetic plates 6 have an air gap 6a between them and through this air gap the flexible strip 3 passes. The arrangement and polarity of the magnets 6 is such that a magnetic field is set up in the air gap 6a having its lines of flux passing transversely through the thin flexible strip 3 from one edge to the other and substantially at right-angles to the longitudinal axis of the strip (FIG. 1).

If by way of the electrical conductors 5 an electric current is passsd through the flexible strip 3, then an electromotive force is generated in the flexible strip in the magnetic field within the air gap 6a and this electromotive force will cause a snap action of the strip into one or other of its bowed positions according to the polarity of the electric current, as is shown in FIG. 2 by broken and chain-dotted lines. By passing a sequence of current pulses of opposite polarity the flexible strip 3 can be caused to move alternately between its two states with the strip remaining in a given one of its two stable positions until a current pulse of opposite polarity is applied to the actuator.

This electrodynamic switch can therefore be used with particular advantage for indicating the polarity of the last current pulse of a group of pulses of different polarities. Moreover, the actuator can be used as a current direction indicator in a D.C. circuit, in which case each current direction is associated with a given one of the two snap-action positions of the flexible strip.

Figure 3:
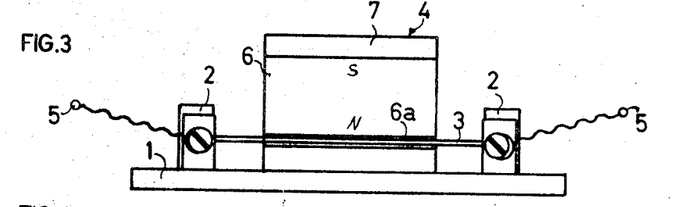
FIG. 3 is a front elevation of a second embodiment of actuator in accordance with the invention which differs slightly from the embodiment of FIGS. 1 and 2.
Figure 4:
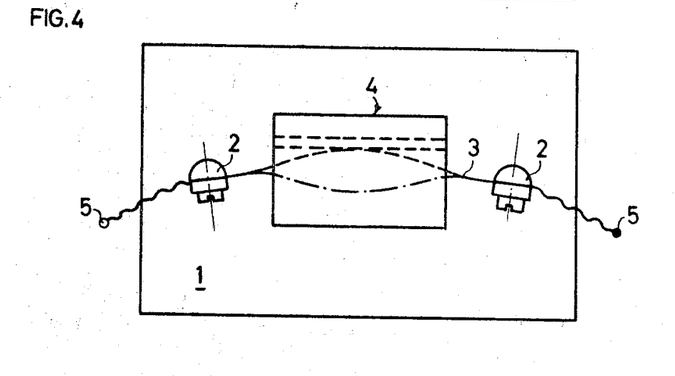
FIG. 4 is a plan view of the actuator shown in FIG. 3.

The embodiment shown in FIGS. 3 and 4 differs from the embodiment shown in FIGS. 1 and 2 only in the following two respects. As shown in FIG. 3, the magnet system 4 includes only a single permanent magnet 6 which is connected to the yoke 7 so that an air gap 6a is provided between the lower pole face of the magnet 6 and the lower fork of the yoke 7. The flexible strip 3 extends through the air gap 6a in the same manner as indicated in the first embodiment. However, as can be seen from FIG. 4, the two clip devices 2 are rotated relative to one another so that their clamping surfaces and consequently also the end portions of the flexible strip 3 no longer lie in a common plane but in two separate planes which extend at an angle to each other. This means that only one of the snap-action positions of the flexible strip 3 is stable, namely that position which is represented in FIG. 4 by a broken line. The other position, which is shown by a chain-dotted line in FIG. 4, represents an unstable state af the flexible strip 3, i.e. the flexible strip 3 will spring back from said other position to said one position automatically as soon as the current causing the strip to take up said other position is interrupted.

Thus, the electrodynamic actuator shown in FIGS. 3 and 4 is particularly suitable for use as a current flow indicator. Only so long as a direct current of predetermined sense flows through the flexible strip 3 will the strip remain in the chain-dotted position (FIG. 4) and as soon as this current flow ceases the flexible strip 3 will return to its stable position.

A similar snap action can also be achieved if the clamping surfaces of the clip devices 2, and consequently the end portions of the flexible strip 3, lie in two planes which are parallel but displaced relative to each other, or if the flexible strip in its stressed state is subject to a pre-tensioning force which exerts a bending force on the flexible strip.

Figure 6:
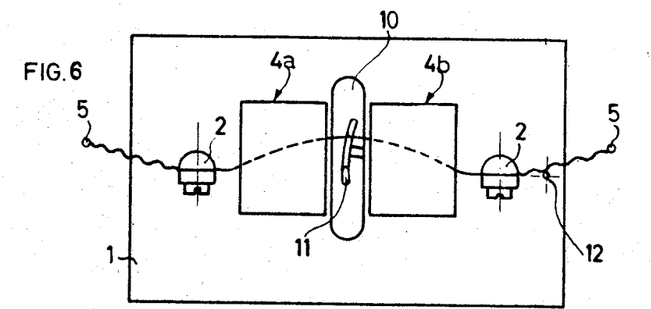
FIG. 6 is a plan view of an embodiment of actuator in accordance with the invention in which the flexible strip member is positioned between two prongs of a pivotally mounted fork.
Figure 7:
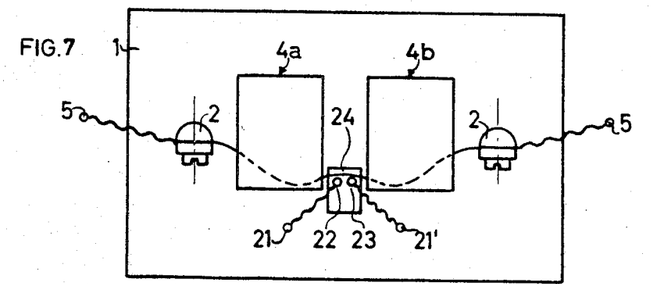
FIG. 7 is a plan view of an embodiment of actuator in accordance with the invention which is constructed as an electrical relay.

The magnet system 4 of the two described embodiments need not in either case be symmetrical with reference to a central plane between the two clip devices 2. In many cases it is preferable for the magnetic field to be divided into two or more separate magnetic fields, as is shown in FIGS. 6 and 7 where two magnet systems 4a and 4b are provided spaced from one another. For certain applications it may even be advantageous to use small magnets with polarities opposed to the main magnet at defined positions, with these oppositely polarised magnets only having an influence over a small percentage of the length of the flexible strip 3. By this means one can increase the curvature of the strip at given positions along the strip during the current flow in order to improve the dynamics of the flexible strip. This makes it possible to ensure, for example, that the magnetic field or fields are concentrated at those positions where the flexible strip in its snap-action positions has the greatest angle of inclination to the straight line between the clip devices 2.

Figure 5:
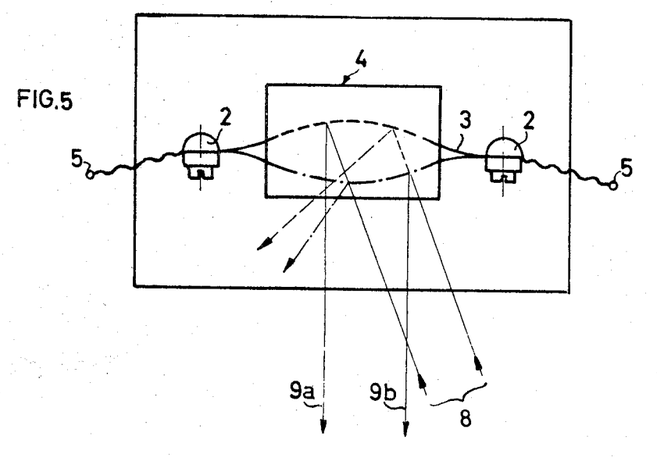
FIG. 5 is a plan view of a further embodiment of actuator in accordance with the invention in which the flexible strip member acts as an optical reflector for causing a deviation in a beam of light.

FIGS. 5, 6 and 7 show further embodiments of electrodynamic actuators developed from the embodiment shown in FIGS. 1 and 2. These further forms make it possible to use the actuator for different specialized applications. Basically, the same or similar modifications are also possible for the embodiment shown in FIGS. 3 and 4 which has only one stable state.

As shown in FIG. 5, a beam 8 of light rays is directed on to the flexible strip 3 at an acute angle to the straight line between the two clip devices 2, and the flexible strip 3 acts as an optical reflecting element on account of its mirror-like surface properties. If the flexible strip 3 occupies a snap-action position as shown by the broken line, then effectively only the left hand edge of the beam of light rays will be visible to an observer in front of the actuator, as shown by the arrow 9a, since the other light rays after reflection travel in different directions. Thus, to the observer, only a part of the left-hand half of the flexible strip 3 will appear illuminated. If on the other hand the flexible strip occupies its other snap-action position, as shown by the chain-dotted line, then effectively only the right-hand edge of the beam of light rays will now be reflected to the observer, as indicated by the arrow 9b, since the rest of the light rays are again transmitted in different directions after reflection. Thus, to the observer, only a part of the right-hand half of the flexible strip 3 will now be visible. From the position of that part of the flexible strip 3 which is illuminated at any given time, the observer can consequently determine quite clearly which of the two positions the flexible strip 3 occupies.

In the embodiment shown in FIG. 6 the electrodynamic actuator, as has already been briefly mentioned, has two magnet systems 4a and 4b which are spaced from one another. The field lines of both magnet systems crossing the flexible strip 3 have the same direction and polarity. Between the two magnet systems 4a and 4b the base plate 1 is provided with a slot 10 through which two prongs of a fork 11 project. The fork 11 is pivotally mounted on the base plate 1 by means of a shaft 12. The flexible strip 3 extends between the prongs of the fork 11. The spacing of the two prongs of the fork is considerably greater than the thickness of the flexible strip.

If the flexible strip 3 occupies the position shown in FIG. 6 then the fork 11 is urged by the flexible strip into the terminal position shown in the drawing. If, however, due to the passage of a current through the flexible strip 3, the strip is moved into its other snap-action position, then the flexible strip entrains the fork 11 during the second half of its path of movement, with the result that the fork is pivoted into its other terminal position. In a manner which is not shown in the drawing the pivotal movement of the fork 11 can be transmitted and further used to actuate an electric contact device or to drive a stepping mechanism for example. The degree of spacing of the prongs of the fork 11 shown in the drawing has the advantage that the flexible strip 3 is not loaded by the fork 11 during the first half of its movement towards its other snap-action position and consequently snaps quickly and safely into said other snap-action position.

In the embodiment shown in FIG. 7, two magnet systems 4a and 4b are again used with the magnet systems spaced from one another on a base plate 1. An insulating member 23 is also secured on the base plate 1, this insulating member projecting partially between the two magnet systems 4a and 4b and carrying two contact pins 22 and 23 against which the flexible strip engages in one of its snap-action positions, thus creating an electrical path between the two contact pins 22 and 23 and closing an external circuit connected to two further terminals 21 and 21'. In this embodiment the actuator is thus acting as a polarised relay.

It should be noted that when such contact is made the above-mentioned external circuit is galvanically connected with each terminal for the reception of switching current pulses via the flexible strip 3. A galvanic isolation of the source of the switching pulses from the external circuit to be switched can however be achieved for example by the use of a pulse transformer having its secondary winding connected to the electric conductors 5. In view of the low impedance of the flexible strip 3 which acts as a current conductor, in many cases some form of impedance transformation may be necessary between the source of the switching pulses and the flexible strip 3. In order to keep the stray voltage generated by the switching pulses at the terminals 21 and 21' as small as possible, the two contact pins 22 and 23 are positioned as close to one another as possible.

Figure 8:
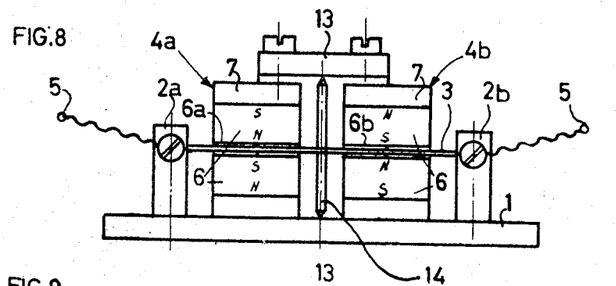
FIG. 8 is a front elevation of a further embodiment of actuator in accordance with the invention, having three points of support for the flexible strip member, and wherein the flexible strip member is pivotally held by means of a rotatable shaft at its central point of support.
Figure 9:
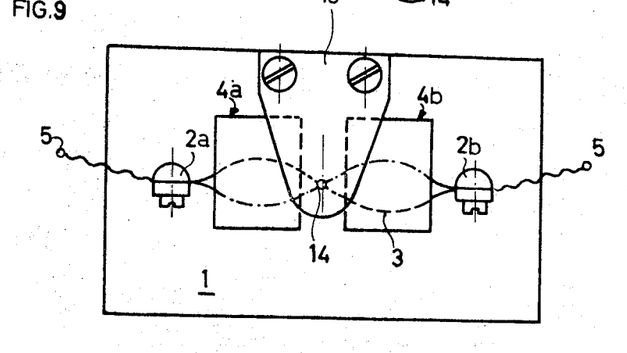
FIG. 9 is a plan view of the actuator shown in FIG. 8.

In the embodiment of actuator illustrated in FIGS. 8 and 9, instead of having two points of support for the flexible strip 3, three points of support are provided, and these are positioned on a common line. The first point of support, the left-hand support point in FIGS. 8 and 9, is provided by a clip device 2a as in the preceding embodiments, and one end portion of the flexible strip 3 is secured in this clip device. The second point of support is located at the centre of the flexible strip 3 and is provided by a shaft 14 fixedly connected to the flexible strip and rotatably mounted by having pointed ends resting in bearing recesses in the base plate 1 and in a bearing support 13 respectively. The bearing support 13 is itself mounted on the base plate 1 and is fixedly secured thereto. By means of the shaft 14 the central portion of the flexible strip 3 which is secured to the shaft is pivotally mounted. The third point of support for the flexible strip 3 is provided by a second clip device 2b in which the right-hand end portion of the flexible strip as seen in FIGS. 8 and 9 is secured. The spacing of clip device 2a from the shaft 14 is smaller than the free length of the portion of the flexible strip 3 which extends between these two points of support; likewise the spacing of the shaft 14 from clip device 2b is smaller than the free length of the portion of the flexible strip 3 which extends between these two points of support. Consequently, the flexible strip 3 can undergo snap action between the two support points 2a and 14 and between the two support points 14 and 2b from one side to the other side of a line connecting the three support points, as is shown in FIG. 9 by broken and chain-dotted lines.

Two separate magnet systems 4a and 4b are secured to the base plate 1, one of these magnet systems 4a being placed between clip device 2a and shaft 14, and the other magnet system 4b being placed between the shaft 14 and the other clip device 2b. Each of the magnet systems 4a and 4b consists of two permanent magnets 6 and a yoke 7 connecting the two permanent magnets with each other and with the base plate. Between the two permanent magnets 6 of each magnet system there is provided an air gap 6a and 6b respectively, through which the flexible strip 3 passes. The magnetic fields in the two air gaps 6a and 6b are oppositely polarised. Electric conductors 5 are connected to the two ends of the flexible strip 3 by means of the clip devices 2a and 2b, and the flexible strip acts as an electric conductor.

If current pulses of alternating polarity are passed through the flexible strip 3, the position of the flexible strip will change with each current pulse, with the result that the shaft 14 will each time be rotated through a given angle. The current pulses of one polarity cause the strip to take up the position shown by the broken line in FIG. 9 and the current pulses of the opposite polarity cause the flexible strip to move to the position indicated by the chain-dotted line. Both positions are stable and the strip will remain in its set position after the end of each current pulse until the application of a current pulse of opposite polarity.

It is also possible to omit one of the two magnet systems 4a and 4b without the snap action described above being affected.

Figure 10:
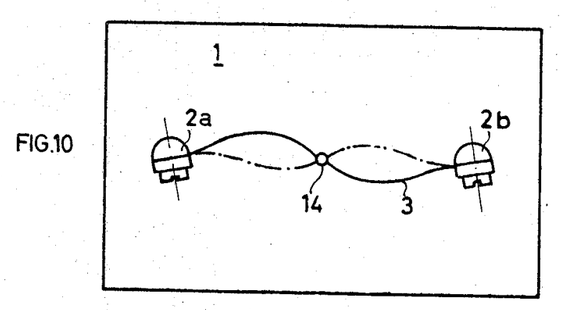
FIG. 10 is a plan view of part of an actuator differing slightly from the embodiment of FIGS. 8 and 9.

FIG. 10 shows a modified form of the electrodynamic actuator described above which is changed in that the flexible strip 3 has only a single stable state. To achieve this, as shown in FIG. 10, the two clip devices 2a and 2b have been rotated in the same sense through a predetermined angle. The clamping surfaces of these clip devices 2a and 2b, and thus also the end portions of the flexible strip 3 secured thereto, now extend in two parallel planes spaced from one another and spaced from the axis of the shaft 14. The stable state of the flexible strip 3 is indicated in FIG. 10 in full outline, while the other, unstable state is shown by a chain-dotted line. The flexible strip 3 returns from the unstable state to the stable state automatically as soon as the current flow through the strip is interrupted.

A similar action can be achieved, for example, if the shaft 14 forming the central point of support is either not positioned on the direct line between the two clip devices 2a and 2b or is not positioned at the centre of this line.

Figure 11:
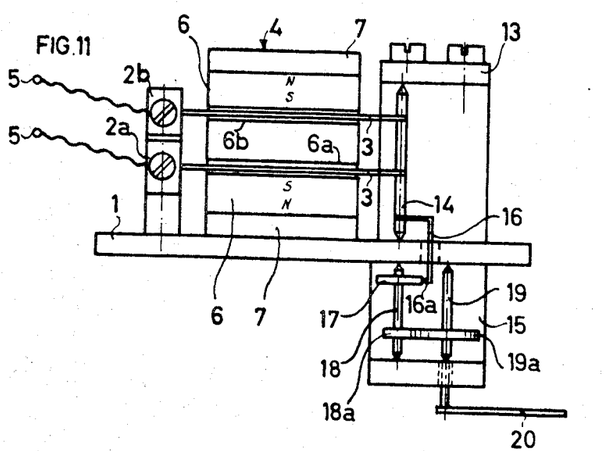
FIG. 11 is a front elevation of another embodiment of electrodynamic snap-action actuator in accordance with the invention, in which two parallel flexible strip members are connected at their one end to a rotatably mounted shaft which is connected to a stepping mechanism.
Figure 12:
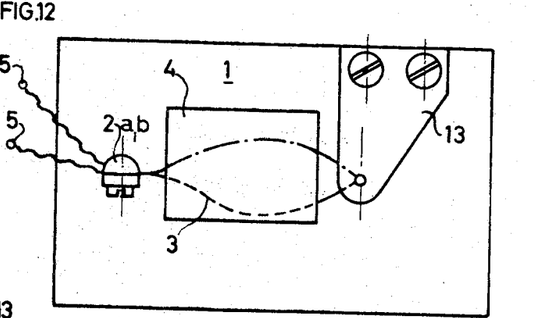
FIG. 12 is a plan view of the embodiment shown in FIG. 11.

The embodiment illustrated in FIGS. 11 and 12 differs from the actuator shown in FIGS. 8 and 9 basically only in the spatial disposition of the parts of the actuator and the snap action is in principle the same. The two clip devices 2a and 2b are positioned above one another on the same side of the base plate 1. In each of these clip devices 2a and 2b a respective end portion of two parallel flexible strips 3 is secured, the other ends of the two flexible strips being secured to a common shaft 14. As in the preceding embodiment, the shaft 14 is rotatably mounted in bearing recesses in the base plate 1 and in a bearing support 13, so that the righthand end portions of the two flexible strips 3 as shown in FIGS. 11 and 12 are pivotally mounted by means of the shaft 14. A single magnet system 4 is provided comprising permanent magnets 6 and a yoke 7, and having two air gaps 6a and 6b through which the flexible strips 3 respectively extend. The magnetic fields in the two air gaps are oppositely polarised. The two clip devices 2a and 2b are electrically insulated from one another. Electric conductors 5 are connected to the clamped end portions of the flexible strips 3, while the other ends of the flexible strips are electrically connected to one another through the shaft 14.

The spacing of the shaft 14 from each of the clip devices 2a and 2b is smaller than the free length of the flexible strips 3 therebetween, so that the flexible strips snap to one or other side of a line between the shaft 14 and the clip devices. Since the two flexible strips 3 are coupled to one another through the shaft 14, the two flexible strips always occupy the same snap-action position, the two positions being indicated respectively by a broken line and by a chain-dotted line in FIG. 12. By passing current pulses of alternating polarity through the two flexible strips 3 connected in series the snap-action position of the flexible strips is changed. Since the clamping surfaces of the clip devices 2a and 2b as well as the clamped end portions of the flexible strips lie in a plane which also contains the axis of the shaft 14 both snap-action positions of the flexible strips are stable.

The shaft 14 carries an arm 16 to which a resilient pawl 16a is secured. The pawl 16a is arranged to engage with a ratchet wheel 17 mounted on a shaft 18 which is itself rotatably mounted at its pointed ends in bearing recesses in the base plate 1 and in a bearing support 15 respectively. Shaft 18 is connected to a further shaft 19 by a gear system 18a, 19a. Shaft 19 carries a pointer 20 which is associated with a stationary scale (not shown).

If current pulses of alternating polarity are applied to the electric conductors 5, then the flexible strips 3 alternate between their snap-action positions, with the result that shaft 14 is rotated back and forth through an accurately defined angle. By means of the ratchet and pawl system 17, 16a and the gear system 18a, 19a the pointer 20 is caused to move through an angle proportional to the number of current pulses. This electrodynamic actuator can thus be used as a pulse counter. The small mass of the flexible strips 3 and of shaft 14 with its associated arm 16 permits the use of a high pulse frequency.

Figure 13:
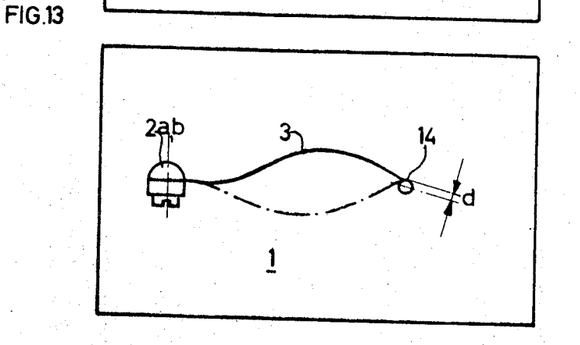
FIG. 13 is a plan view showing part of a further form of actuator based upon the embodiment of FIGS. 11 and 12.

By certain means, which will now be described, the flexible strips 3 can be arranged to have only one stable state. In order to achieve this, as in the embodiment shown in FIG. 13, the one end portions of each flexible strip 3 are no longer connected radially to shaft 14 but are connected tangentially thereto, so that the end portions of the flexible strips lie at a given spacing d from the axis of the shaft 14. Although in this embodiment the actuator has only one stable state the angle of rotation of shaft 18, and thus also of the pointer 20, is practically independent of the magnitude of the current pulses which cause the flexible strips to move temporarily into the unstable state, provided that the magnitude of the current exceeds a given minimum value.

Figure 14:
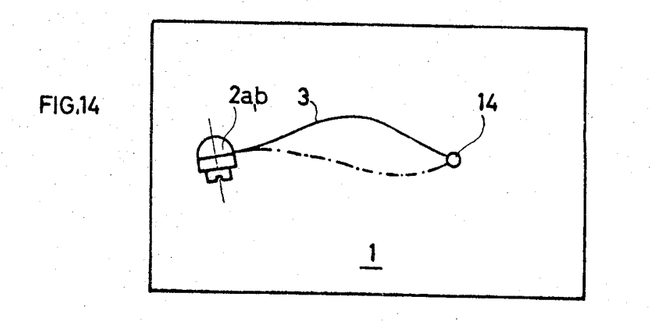
FIG. 14 is a plan view of a further embodiment of actuator in accordance with the invention.

A further modification of actuator with only one stable state is shown in FIG. 14, according to which the clip devices 2a and 2b are rotated through a small angle so that their clamping surfaces and thus the clamped end portions of the flexible strips 3 extend in a plane which is spaced from the axis of shaft 14.

At this point it should be noted that the embodiments with only one stable state are suitable only for pulses of one polarity.

Figure 15:
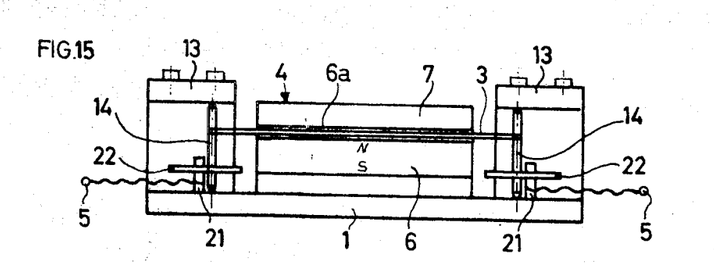
FIG. 15 is a front elevation of yet another embodiment of actuator in which the flexible strip member is pivotally mounted at each of two support points.
Figure 16:
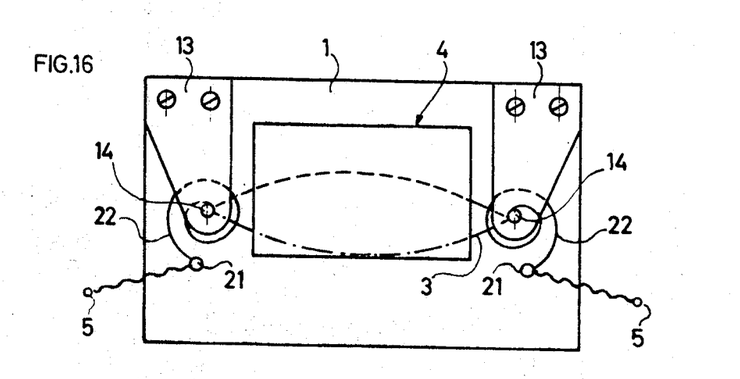
FIG. 16 is a plan view of the actuator of FIG. 15.

In the further embodiment shown in FIGS. 15 and 16 only one flexible strip 3 is used, this contact having its two ends connected to separate shafts 14. Each shaft 14 is rotatably mounted by having its pointed ends received in bearing recesses in the base plate 1 and in a bearing support 13. Thus, the flexible strip 3 is pivotally held at both ends. The spacing of the two shafts 14 from each other is smaller than the free length of the flexible strip 3 so that the flexible strip snaps to one or other side of a plane containing the axes of the shafts 14, as is shown in FIG. 16 by broken and chain-dotted lines. Both snap-action positions are stable. A single magnet system 4 which consists of a permanent magnet 6 and a yoke 7 and has an air gap 6a is arranged such that the flexible strip 3 extends through the air gap in which the lines of magnetic flux cut the flexible strip which acts as an electrical conductor. For feeding the current pulses to the flexible strip 3 two very soft spiral springs 22 of electrically conductive material are used. The spiral springs 22 connect the shafts 14 electrically to terminals 21 to which the electric conductors 5 are connected. The action of the actuator is the same as that of the actuator previously described with reference to FIGS. 1 and 2.

Figure 17:
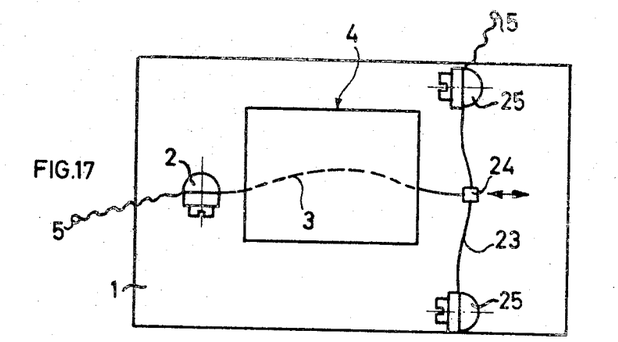
FIG. 17 is a plan view of a further embodiment of actuator in which one support point for the flexible contact is yieldingly resilient.

The embodiment shown in FIG. 17 differs from the first embodiment shown in FIGS. 1 and 2 only in the fact that one of the clip devices 2 is replaced by a yielding point of support 24 provided at one end of the flexible strip 3. The yielding support 24 is positioned at the centre of a leaf spring 23 which is supported by means of clip devices 25 mounted on the base plate 1 and which extends substantially at right-angles to the flexible strip 3. By means of this arrangement the support 24 is yieldable in the direction of the line connecting the clip device 2 with the support 24 and under the effect of the leaf spring 23 is urged towards the clip device 2. With each change in the snap-action position of the flexible strip 3 the support 24 is temporarily moved away from the clip device 2 through a small distance and afterwards again returns to its initial position. This translational movement of the support 24 can be used for example to actuate electrical contacts or to drive a stepping mechanism. The particular advantage of this embodiment lies in the fact that the force necessary to reverse the flexible strip 3 from one to the other snap-action position is particularly small.

The actuator shown in FIG. 17 may be modified in a manner which is not shown in the drawings by using a leaf spring 23 which is unsymmetrical with reference to the line connecting the support 24 and the clip device 2. It is, for example, also possible to completely omit one of the clip devices 25 and the associated half of the leaf spring 23.

Figure 18:
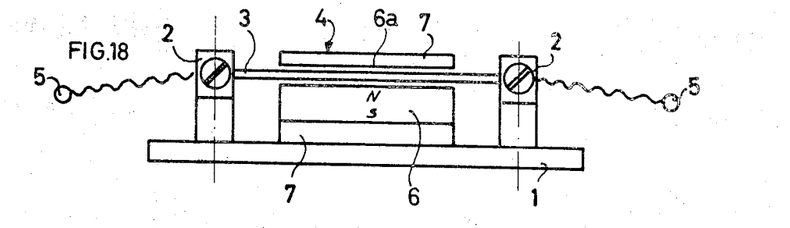
FIG. 18 is a front elevation of another embodiment of actuator in accordance with the invention; and, FIG. 19 is a plan view of the embodiment of actuator shown in FIG. 18.
Figure 19:
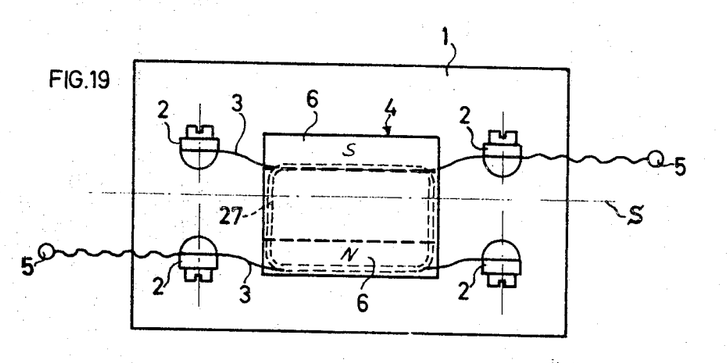

The embodiment of electrodynamic actuator shown in FIGS. 18 and 19 comprises two flexible strips 3 which are parallel and are arranged at the same spacing from the base plate 1. Each of the two flexible strips 3 is supported by means of two clip devices 2 mounted on the base plate 1. A flat coil 27 wound from thin wire of electrically insulating material and having a rectangular configuration is secured with two opposed sides fixed to the two flexible strips 3 so that each winding of the spool 27 has a conductive portion extending along the one flexible strip and a conductive portion extending along the other flexible strip. Consequently, each flexible strip carries several electrical conductors, the number of which corresponds to the number of windings on the spool 27. A magnet system 4 which consists of two permanent magnets 6 and two yokes 7 is arranged on the base plate 1 and provides two air gaps 6a through which the flexible strips 3 and the sides of the spool 27 secured thereto extend. In the air gaps the magnetic field lines cut the relevant conductive portions of the spool substantially at right-angles. The two magnets 6 are oppositely poled. The dimension of the spool 27 in the direction of the magnetic field lines preferably at least approximately corresponds to the width of the flexible strips 3.

If by means of the electric conductors 5 current pulses of alternating polarity are passed through the spool 27 then the flexible strips 3 will change their position with each current pulse. In FIG. 19 only one of these stable states is shown; the other stable state is a corresponding position but on the other side of the centre line S. Since in this embodiment there is more than a single electrical conductor extending in each air gap the actuator is more sensitive than the embodiments previously described, i.e. the changeover from the one to the other snap-action position can be caused with a current pulse of smaller magnitude.

The actuator shown in FIGS. 18 and 19 can be modified in a manner not shown in the drawings so that it forms a monostable device, i.e. having only a single stable state for the flexible strip 3. In order to achieve this the clip devices 2 are rotated through a given angle, as shown and described with reference to FIG. 4 for example.

Each of the embodiments of electrodynamic actuator shown in the drawings can be modified if desired so that the flexible strip 3 is not itself used as an electrical conductor if in such a case at least one electrical conductor, suitably coated with an insulating material, is secured to the flexible strip to extend along the longitudinal direction thereof. The insulated conductor may be secured to the flexible strip by means of an adhesive for example. The operation of the snap-action actuator remains unchanged.

We claim:

1. An electrodynamic snap-action actuator comprising a support, at least one elongated relatively thin flexible strip member having an inherent leaf spring characteristic, means spaced along said support respectively securing longitudinally spaced points on said strip member to said support, the distance between said strip member securing means spaced along said support being less than the free length of that portion of said strip member intermediate its securing points thereby causing said intermediate portion of said strip member to become bowed and occupy one of two alternative positions to one side or the other of a line interconnecting said spaced strip member securing means, said flexible strip member providing at least one electrical conductor extending longitudinally therealong, electrical terminal means connected with each end of said electrical conductor for feeding current therethrough, and magnetic means including magnetic poles mounted on said support adjacent said flexible strip member and spaced therefrom, said magnetic poles being located such as to produce a continuous magnetic field passing transversely through said electrical conductor and edgewise to said flexible strip member thereby to cause said intermediate bowed portion of said flexible strip member to flex in a snap-acting manner from one to the other of said two altrnative positions when current is passed through said electrical conductor.

2. An electrodynamic actuator as defined in claim 1 wherein both of said alternative positions of said bexible strip member are stable in the absence of current flow through said electrical conductor, and said flexible strip member is caused to flex from one to the other of said two alternative stable positions as determined by the direction of current flow through said electrical conductor.

3. An electrodynamic actuator as defined in claim 1 wherein only one of said alternative positions of said flexible strip member is stable in the absence of current flow through said electrical conductor, said flexible strip member being caused to flex from said stable position to an unstable position upon passage of current through said electrical conductor and to return to said stable position upon cessation of current flow.

4. An electrodynamic actuator as defined in claim 1 wherein said securing means on said support fixedly secure the corresponding spaced points on said flexible strip member against any movement.

5. An electrodynamic actuator as defined in claim 4 wherein the points along said flexible strip member which are fixedly secured by said securing means lie in different planes.

6. An electrodynamic actuator as defined in claim 1 wherein said securing means spaced along said support fixedly secure one point on said flexible strip member against any movement and secure the other point on said flexible strip member for pivotal movement about a pivot axis extending at a right angle with respect to the longitudinal direction of said flexible strip member and edgewise thereto.

7. An electrodynamic actuator as defined in claim 6 wherein said point on said flexible strip member which is secured against any movement lies in a plane which is spaced from the pivot axis at the other securing point on said flexible strip member.

8. An electrodynamic actuator as defined in claim 1 wherein said securing means spaced along said support secure both points on said flexible strip member for pivotal movement about a pivot axis extending at a right angle with respect to the longitudinal direction of said flexible strip member and edgewise thereto.

9. An electrodynamic actuator as defined in claim 1 wherein one of said securing means for one of said points on said strip member is yieldably mounted on said support by means of a spring member providing limited displacement of said securing means in the longitudinal direction of said flexible strip member away from the other securing means for the other point on said strip member.

10. An electrodynamic actuator as defined in claim 1 wherein at least one of said strip member securing means includes a pivot shaft to which the corresponding point on said strip member is fastened, said shaft extending at a right angle with respect to the longitudinal direction of said strip member and edgewise thereto, and means mounting said pivot shaft on said support for rotation about its axis for delivering an output drive in response to movement of said bowed portion of said strip member from one to the other of said alternative positions.

11. An electrodynamic actuator as defined in claim 1 wherein said bowed intermediate portion of said flexible strip member includes an optical reflecting surface.

12. An electrodynamic actuator as defined in claim 1 wherein said bowed portion of said flexible strip member is provided with an electrical contact means cooperative with a stationary electrical contact means to establish an electrical switch controlled in accordance with the movement of said flexible strip member from one to the other of its alternative positions.

13. An electrodynamic actuator as defined in claim 1 and which further includes a fork pivotally mounted on said support, the tines of said fork embracing said bowed portion of said flexible strip member, and said fork being actuated about its pivot axis by said bowed portion of said flexible strip member by contact of said bowed portion with said tines as said bowed portion moves from one to the other of its said alternative positions.

14. An electrodynamic snap-action actuator comprising a support, at least one elongated relatively thin flexible strip member having an inherent leaf spring characteristic, first and second means spaced along said support respectively securing the ends of said strip member to said support, means pivotally securing a point on said strip member intermediate the ends thereof to said support for rotation about a pivot axis extending at a right angle to the longitudinal direction of said strip member and edgewise thereto, the distance between said pivot axis and each of said first and second strip end securing means being less than the free length of that portion of said strip member between said pivot axis and the corresponding ends of said strip member thereby to cause a first portion of said strip member between one end thereof and said pivot axis to become bowed and occupy a position to one side of a line interconnecting said strip end securing means and a second portion of said strip member between the opposite end of said strip member and said pivot axis to become bowed and occupy a position to the other side of said line interconnecting said strip end securing means, said flexible strip member providing at least one electrical conductor extending longitudinally therealong for at least the distance between one end of said strip member and said pivot axis, electrical terminal means connected with each end of said electrical conductor for feeding current therethrough, and magnetic means including magnetic poles mounted on said support adjacent that portion of said strip member along which said electrical conductor extends, said magnetic poles being located such as to produce a continuous magnetic field passing transversely through said electrical conductor and edgewise to said strip member thereby to cause the bowed portion thereof along which said electrical conductor extends to be flexed electrodynamically in a snap-acting manner from one to the other side of said line interconnecting said strip ends when current is pased through said electrical conductor.

15. An electrodynamic snap-action actuator as defined in claim 14 wherein said electrical conductor extends along said strip member from one end thereof to the other, there being a first set of magnetic poles mounted on said support adjacent that bowed portion of said strip member between said pivot axis and one end of said strip member, and a second set of magnetic poles mounted on said support adjacent that bowed portion of said strip member between said pivot axis and the other end of said strip member, thereby to cause both bowed portions of said strip member to be flexed electrodynamically in a snap-acting manner from one to the other side of said line interconnecting said strip ends when current is passed through said electrical conductor.

16. An electrodynamic snap-action actuator as defined in claim 15 wherein said first and second sets of magnetic poles produce continuous magnetic fields of opposite polarity respectively in relation to the direction in which the magnetic field traverses the bowed portions of said strip member, and current is passed through said electrical conductor in the same direction from one end of said strip member to the other.

17. An electrodynamic snap-action actuator comprising a support, a pair of elongated relatively thin flexible strip members having an inherent leaf spring characteristic, said strip members being located parallel to each other in spaced relation, means spaced along said support respectively securing longitudinally spaced points on each of said strip members to said support, the distance between said spaced securing means for each of said strip members being less than the free length of that portion of each said strip member intermediate its securing points thereby causing the intermediate portion of each said strip member to become bowed and occupy one of two alternative positions to one side of the other of a line interconnecting said spaced strip member securing means, an electrical coil positioned between said parallel spaced strip members, said coil including at least one wire extending along each of two opposite sides thereof and longitudinally along the bowed portion of each said strip member and which is secured thereto thus supporting said coil on said strip members, electrical terminal means connected to said coil for feeding current therethrough, and magnetic means including magnetic poles mounted on said support adjacent said strip members and spaced therefrom, said magnetic poles being located such as to produce two continuous magnetic fields of opposite polarities, a magnetic field of one polarity extending across one side of said coil and the bowed portion of one of said strip members and edgewise thereto, and a magnetic field of the opposite polarity extending across the opposite side of said coil and the bowed portion of the other strip member and edgewise thereto, thereby to cause said bowed portions of said strip members to flex in a snap-acting manner from one to the other of said two alternative positions when current is passed through said coil.

References Cited

UNITED STATES PATENTS

| | | | |
|---|---|---|---|
| 775,680 | 11/1904 | Pederson | 335—93 |
| 3,164,686 | 1/1965 | Tibbetts | 335—306 |
| 3,284,737 | 5/1966 | Bowyer | 335—302 |
| 1,641,201 | 9/1927 | Ruppel | 337—54 |
| 2,518,480 | 8/1950 | Lilja | 335—188 |
| 2,621,269 | 12/1952 | Juillard | 335—188 |
| 2,658,972 | 11/1953 | Brown | 335—188 |

FOREIGN PATENTS 426,603  3/1926  Germany.

HAROLD BROOME, Primary Examiner

U.S. Cl. X.R.

335—147.